United States Patent [19]
Ozawa

[11] Patent Number: 5,960,135
[45] Date of Patent: Sep. 28, 1999

[54] OPTICAL INTEGRATED CIRCUIT FOR BIDIRECTIONAL COMMUNICATIONS AND METHOD FOR PRODUCING THE SAME

[75] Inventor: Shoichi Ozawa, Ichihara, Japan

[73] Assignee: The Furukawa Electric Co., Ltd., Tokyo, Japan

[21] Appl. No.: 08/904,291

[22] Filed: Jul. 31, 1997

[30] Foreign Application Priority Data

Jul. 31, 1996 [JP] Japan ................................. 8-218016

[51] Int. Cl.$^6$ .............................. G02B 6/24; G02B 6/12; G02B 6/126
[52] U.S. Cl. .............................. 385/24; 385/14; 359/154; 359/156; 359/163
[58] Field of Search .................. 385/14, 24; 359/154, 359/156, 163; 257/432

[56] References Cited

U.S. PATENT DOCUMENTS

| | | | |
|---|---|---|---|
| 5,031,984 | 7/1991 | Eide et al. | 350/96 |
| 5,091,983 | 2/1992 | Lukosz | 385/13 |
| 5,097,299 | 3/1992 | Donhowe et al. | 357/19 |
| 5,361,157 | 11/1994 | Ishikawa et al. | 359/168 |
| 5,502,781 | 3/1996 | Li et al. | 385/4 |
| 5,572,615 | 11/1996 | Emori | 385/92 |

*Primary Examiner*—John D. Lee
*Assistant Examiner*—Victoria D. Hao
*Attorney, Agent, or Firm*—Lacasse & Associates

[57] ABSTRACT

The invention relates to an optical integrated circuit for bidirectional communications which is able to achieve a downsizing and high integration with the production cost thereof decreased. An optical waveguide circuit is formed on a substrate and a photo diode (PD) is connected to the outgoing end side thereof. The optical waveguide circuit has a circuit of an optical wavelength division multiplexer which causes communication signal light ($\lambda 1$) inputted from a bidirectional light input/output port to be transmitted through a communication light selective transmission filter and to be outputted from a communication light output port and causes non-communication light ($\lambda 2$) to be reflected by the communication light selective transmission filter and to outgo through a non-communication light output port. A piezoelectric element is provided on the upper part at the outgoing side of the communication light output port. When the communication signal light passing through the optical waveguide circuit is inputted into the PD 8, the PD 8 is actuated in the reception mode to receive communication signal light and is not driven in the transmission mode to reflect communication signal light toward the optical waveguide circuit side by a high reflection coating film. The reflection light is given polarization plane modulation by the piezoelectric element, and the polarization plane modulated light is transmitted from the bidirectional light input/output port.

12 Claims, 6 Drawing Sheets

Prior Art

Prior Art

5,960,135

OPTICAL INTEGRATED CIRCUIT FOR BIDIRECTIONAL COMMUNICATIONS AND METHOD FOR PRODUCING THE SAME

FIELD OF THE INVENTION

The present invention relates to an optical integrated circuit for bidirectional communication and a method for producing the same mainly utilized with an optical fiber communication system.

BACKGROUND OF THE INVENTION

FIG. 6 shows one an exemplary configuration of an optical fiber communication system for a subscriber system. The system proposes a low-speed communication service of POTS (Plain Old Telephone Service) (for example, telephone service, etc.) and a high-speed communication service which is mainly a transmission of video signals, etc.

In the same drawing, optical transmitter-receiver equipment 5 installed in a station 1 is connected to the respective optical transmitter-receiver facilities 5 of a plurality (N units) of subscriber houses 2 via an optical fiber transmission cable 3 and a 1:N star coupler 4, and the optical transmitter-receiver facilities 5 in the station 1 and the respective subscriber houses 2 respectively have an optical wavelength division multiplexer (WDM) 10, 1×2 optical coupler 9, laser diode 6, and photo diode 8. Furthermore, FIG. 7 shows optical transmitter-receiver equipment 5 in a subscriber house 2, wherein a light emission drive circuit 12 and a modulation circuit 57 are connected to the laser diode 6, and a reverse bias impression device 13, an optical receiver drive circuit 51 and a receiver demodulation circuit 14 are connected to the photo diode 8. Furthermore, a picture signal receiver such as video 11, etc. is connected to the optical wavelength division multiplexer 10.

In the optical transmitter-receiver equipment 5 in a subscriber house 2, when both communication signal light of wavelength 81 (for example 1.31:m) and picture signal light as non-communication light of wavelength 82 (for example 1.55:m) different from the above communication signal light enter the optical wavelength division multiplexer 10, the same permits the communication signal light of wavelength 81 to be transmitted to the 1×2 optical coupler 9 side and, on the other hand, the same permits the picture signal light of wavelength 82 to be transmitted to the video 11 side.

The 1×2 optical coupler 9 transmits communication signal light inputted through the optical wavelength division multiplexer 10 to the photo diode 8 side. Furthermore, the 1×2 optical coupler 9 is constructed so that transmission light (communication signal light) of wavelength 81, which is transmitted from the laser diode 6, enters the same, wherein the 1×2 optical coupler 9 transmits this communication signal light to the optical wavelength division multiplexer 10 side. Transmission of communication signal light by the laser diode is carried out by the light emission drive circuit 12 and modulation circuit 57.

The photo diode 8 functions as a semiconductor light reception element, and if the reverse bias impression device 13 for impressing reverse bias voltage is driven by the light reception drive circuit 51, the reverse bias voltage is impressed to the photo diode 8. At this time, an optical current responsive to the modulation of the communication signal light incident into the photo diode 8 is detected by the reception demodulation circuit 14.

When an optical communication is carried out between the station 1 side and a subscriber house 2 side by a system shown in FIG. 6 using such an optical transmitter-receiver equipment 5, for example, the communication signal light is made incident into an optical fiber transmission cable 3 via the 1×2 optical coupler 9 and optical wavelength division multiplexer 10 by driving the laser diode 6 secured at the station 1 side optical transmitter-receiver equipment 5 and transmitted via the optical fiber transmission cable 3. Thereafter, the communication signal light is inputted into the optical transmitter-receiver equipment 5 at the subscriber house 2 side. Thereby, this inputted communication signal light is transmitted to the optical wavelength division multiplexer 10, 1×2 optical coupler 9 and photo diode 8 in the optical transmitter-receiver equipment 5 of a subscriber house 2 in order, and the same communication signal light is received by the photo diode 8 and is detected by the reception demodulation circuit 14 as an optical current as described above.

Furthermore, to the contrary, when communication signal light is transmitted from a subscriber house 2 to the station 1 side, the laser diode 6 in the transmitter-receiver equipment 5 of the subscriber house 2 is driven to transmit the communication signal light through the 1×2 optical coupler 9 and optical wavelength division multiplexer 10 in order and to transmit the same through an optical fiber transmission cable 3. The communication signal light transmitted through the optical fiber transmission cable 3 is received by the optical transmitter-receiver equipment 5 in the station 1 side in compliance with the same actions as those at the optical transmitter-receiver equipment 5 of the abovementioned subscriber house 2 side.

Furthermore, for example, as shown in FIG. 6, when picture signal light of wavelength 82 is transmitted from a picture signal light transmission device 67 at the station 1 side, this picture signal light is transmitted to the optical fiber transmission cable 3 via the optical wavelength division multiplexer 10 at the station 1 side and is made incident into the optical transmitter-receiver equipment 5 at the subscriber house 2 side. Thereafter, the picture signal light is divided by the optical wavelength division multiplexer 10 and is received by a video 11 at the subscriber house 2 side, wherein the picture signal light is reproduced.

FIG. 8 shows a device configuration of the conventional optical transmitter-receiver equipment 5. As shown in the same drawing, this device forms an optical waveguide circuit 20 having a core 18 on a circuit board 25, and the optical waveguide circuit 20 is constructed so as to form a lower clad layer 27a, a core 18, and an upper clad layer 27b in the order. A fiber-fixing fixture 21, at which two optical fibers 23a and 23b are provided, is provided at one end side of the optical waveguide circuit 20. The respective optical fibers 23a and 23b are optically connected to the core 18 of the optical waveguide circuits 20, respectively.

Furthermore, a laser diode 6 and a photo diode 8 are provided and optically connected to the other end side of the optical waveguide circuit 20 and the laser diode 6 and photo diode 8 are respectively mounted on the circuit board 25 via an electrode pattern 19. Furthermore, the laser diode 6 is connected to the abovementioned modulation circuit 57 and light emission drive circuit 12, which are not illustrated in FIG. 8, via the electrode pattern 19 and the photo diode 8 is connected to the abovementioned reverse bias impression device 13, reception drive circuit 51 and reception demodulation circuit 14 via the electrode pattern 19.

In the device illustrated in the same drawing, the optical waveguide circuit 20 constitutes the abovementioned optical wavelength division multiplexer 10 and 1×2 optical coupler 9, and the optical wavelength division multiplexer 10 has a communication light selective transmission filter 24 inserted into a filter groove 22 of the optical waveguide circuit 20. The communication light selective transmission filter 24 is able to transmit the communication signal light of wavelength 81 and reflect the picture signal light of wavelength 82.

In a case where the optical transmitter-receiver equipment 5 is configured as shown in the same drawing, as both the communication signal light of wavelength 81 and the picture signal light of wavelength 82 enter the optical transmitter-receiver equipment 5 from the optical fiber 23a, the picture signal light of wavelength 82 of these rays of light is reflected by the communication light selective transmission filter 24 of the optical wavelength division multiplexer 10 and is caused to outgo from the optical fiber 23b, and the communication signal light of wavelength 81 passes through the communication light selective transmission filter 24 and enters the 1×2 optical coupler 9, wherein the same enters the photo diode 8 via the 1×2 optical coupler 9. Furthermore, the communication signal light of wavelength 81 transmitted from the laser diode 6 passes through the communication light selective transmission filter 24 after passing through the 1×2 optical coupler 9, and the same is caused to outgo from the optical fiber 23a.

OBJECT AND SUMMARY OF THE INVENTION

However, since an optical transmission system for optical subscribers illustrated in FIG. 6 is an optical transmission system aiming at, for example, subscriber houses 2 of general households, it is highly recommended that the system construction cost is decreased as much as possible in view of spread of the service thereof. Particularly, it is requested that the cost of the optical transmitter-receiver equipment 5 to be installed at the subscriber house 2 side is decreased and the same is highly integrated with the size thereof reduced.

However, conventional optical transmitter-receiver equipment 5 has a laser diode 6 and a photo diode 8 as described above, and in particular since the light emission drive circuit 12 for driving the laser diode 6 must transmit intensive light for transmission from a subscriber house 2 side to the station 1 side by using the laser diode 6, it is necessary to prepare a large-sized transmitter-receiver equipment 5. Therefore, it was difficult to make the optical transmitter-receiver equipment 5 small.

Furthermore, in conventional optical transmitter-receiver equipment 5, it is necessary to optically connect both the optical components of the laser diode 6 and photo diode 8 to the core 18 of the optical waveguide circuit 20 at a high accuracy. There is such a problem where the core alignment work is very difficult. Especially, since the mode field diameter of the laser diode 6 is very different from the mode field diameter of the core 18 and the shapes thereof are also much different from each other, there is such a problem where the optical coupling loss is unavoidably made large. Therefore, in order to compensate that, there arise many difficulties, that is, the output of the laser diode 6 must be increased greatly, a reflection countermeasure must be provided, and since a laser is a heat generating element, a Peltier cooling element is incorporated and the temperature control circuit thereof also becomes necessary.

Thus, in the conventional optical transmitter-receiver 5, since an especially large-sized light emission drive circuit 12 is necessary, there is a limit in the downsizing and high integration of the component compositions. Furthermore, a number of processes in line with the mounting of the respective optical components are required and they are not easy. Thus, it was difficult to decrease the cost of production.

The present invention attempts to solve the abovementioned shortcomings and problems, and it is therefore an object of the invention to provide an optical integrated circuit for bidirectional communications and a method for producing the same, which are able to make optical transmitter-receiver equipment small and highly integrated and further, to reduce the production cost.

In order to achieve the above object, the present invention is able to solve the abovementioned shortcomings and problems by providing the following means. That is, an optical integrated circuit for bidirectional communications according to the invention is an optical integrated circuit in which an optical waveguide circuit having a lower clad layer, a core and an upper clad layer formed in the order on a substrate and a semiconductor light reception element is connected to the outgoing end side of the core of the corresponding optical waveguide circuit, comprising: a reception mode actuation portion in which a reflector for a communication signal light is provided at the abovementioned semiconductor light reception element, a polarization plane modulating element is formed on the surface side of the upper clad layer of an optical waveguide circuit in a channel of the reflection light reflected by the reflector and arriving at the bidirectional input/output end of the abovementioned optical waveguide circuit, the abovementioned semiconductor light reception element is actuated in line with a synchronization timing of reception when communication signal light is inputted into the semiconductor light reception element through the abovementioned optical waveguide circuit thereby causing the communication signal light to be received by the semiconductor light reception element; and a transmission mode actuation portion in which the communication signal light is reflected to the bidirectional input/output end side of the abovementioned optical waveguide circuit by the reflector without actuating the semiconductor light reception element when the communication signal light is inputted into the semiconductor light reception element, in line therewith polarization plane modulation is given to the reflection light by the abovementioned polarization plane modulating element, and the corresponding polarization plane modulated light is made transmission light and the same is transmitted to the bidirectional input/output end side of the core of the abovementioned optical waveguide circuit.

An optical integrated circuit for bidirectional communications according to the invention is characterized in that the abovementioned optical waveguide circuit is constituted as an optical wavelength division multiplexer having a bidirectional light input/output port in which both communication signal light and non-communication signal light, the wavelength of which is different from that of the communication signal light, are made incident, a communication light output port for leading only the communication signal light of the communication signal light and non-communication signal light to the input side of a semiconductor light reception element, and a non-communication signal light output port for leading the non-communication signal light in a direction deviating from the input side of the corresponding semiconductor light reception element.

Furthermore, an optical integrated circuit for bidirectional communications according to the invention is also characterized in that the abovementioned optical waveguide circuit has the main light path for connecting the bidirectional light input/output port and communication light output port, a non-communication light output port is provided at the outgoing end side of a branch path branched from the corresponding main light path, and a communication light selective transmission filter is provided at the branch portion of the corresponding main light path and branch path, which is able to transmit the communication signal light incident from the abovementioned bidirectional light input/output port to the abovementioned communication light output port side, to transmit the light reflected by a semiconductor light reception element of the communication signal light to the abovementioned bidirectional light input/output port, and to reflect the non-communication light incident from the abovementioned bidirectional light input/output port to the abovementioned branch path side.

Furthermore, an optical integrated circuit for bidirectional communications according to the invention is further characterized in that the abovementioned optical waveguide circuit is constructed to be a Mach-Zehnder interferometer type circuit which has the first optical waveguide and second optical waveguide, wherein the first optical waveguide and second optical waveguide are arranged and formed in a row with a gap provided therebetween, two directional couplers formed by making the corresponding first optical waveguide and second optical waveguide closer to each other are disposed in a series partway of the first optical waveguide and second optical waveguide, and a phase-shifting portion in which the lengths of the first optical waveguide and second optical waveguide are relatively changed intervenes between two directional couplers, and the incident side of any one of the abovementioned first and second optical waveguides is made a bidirectional light input/output port, the outgoing side of any one of the abovementioned first and second optical waveguides is made a communication light output port, and the outgoing side of the other optical waveguide is made a non-communication output port.

Furthermore, an optical integrated circuit for bidirectional communications according to the invention is further characterized in that the abovementioned polarization plane modulating element is formed of a piezoelectric element, the abovementioned piezoelectric element is constructed by depositing a lower electrode, a piezoelectric member and an upper electrode in the order on the surface side of the upper clad layer, the substrate is made of a silicon substrate or silica glass substrate, and the optical waveguide circuit is formed by any one of flame deposition method, evaporation method, and chemical vapor phase growth method.

Furthermore, an optical integrated circuit for bidirectional communications according to the invention is further characterized in that a reverse bias impression device for impressing reverse bias voltage is connected to the abovementioned semiconductor light reception element, the reception mode actuation portion is constructed so as to drive the reverse bias impression device when communication signal light is inputted into the corresponding semiconductor light reception element, and the transmission mode actuation portion establishes a bias-free or forward bias state by stopping the reverse bias impression drive of the abovementioned reverse bias impression device when communication signal light is inputted into the semiconductor light reception element, wherein the communication signal light inputted into the semiconductor light reception element is permitted to transmit from the input side of the corresponding semiconductor light reception element to the reflector side.

Still furthermore, a method for producing an optical integrated circuit for bidirectional communications according to the present invention is characterized in that after optical waveguide circuits are formed on a substrate at areas other than those where semiconductor light reception elements are disposed and electrode patterns are deposited and formed on the surface side of the area, at which semiconductor light reception elements are disposed, of a substrate when producing an optical integrated circuit for bidirectional communications constructed as described above, semiconductor light reception elements are mounted on the corresponding electrode patterns and the corresponding semiconductor light reception elements are optically connected to the outgoing end side of the core of the abovementioned optical waveguide circuits.

In an optical integrated circuit for bidirectional communications, constructed as above, according to the invention, a reception mode actuation portion is connected to the semiconductor light reception elements connected to the outgoing end side of the core of the optical waveguide circuit, wherein when communication signal light is inputted into the semiconductor light reception element through the optical waveguide circuit, the semiconductor light reception element is actuated by the reception mode actuation portion in line with the synchronization timing of reception, thereby the communication signal light is received by the semiconductor light reception element.

Furthermore, with the invention, a polarization plane modulating element is formed at the outgoing end side of the core of the abovementioned optical waveguide circuit, a reflector of communication signal light is provided at the abovementioned semiconductor light reception element, and the semiconductor light reception element is connected to the transmission mode actuation portion. When light is transmitted from the optical integrated circuit for bidirectional communications, the transmission mode actuation portion is able to reflect the communication signal light to the bidirectional input/output end side of the optical waveguide circuit by a reflector without actuating the semiconductor light reception element when the communication signal light is inputted into the semiconductor light reception element, and is able to modulate the plane of polarization by a polarization plane modulating element with respect to the reflected light of the communication signal light. Thereby the polarization plane modulated light is made transmission light and is transmitted to the bidirectional input/output end side of the core of the optical waveguide circuit.

Thus, in the invention, since it is possible to perform both reception and transmission of communication signal light using semiconductor light reception elements by actuation of the transmission mode actuation portion and reception mode actuation portion, an optical integrated circuit can be formed without requiring any light emitting diode such as laser diodes, etc. which were requisite in the conventional optical transmitter-receiver equipment. Therefore, not only it is possible to achieve a downsizing and high integration of the equipment equivalent to the omission of light emitting diodes such as laser diodes, but also no large-sized drive circuits, etc. for driving the light emitting elements are required, wherein further downsizing and high integration can be attempted along with decreasing the cost of production. Furthermore, since it is not necessary to optically couple both the light emitting elements such as laser diodes and light reception elements to an optical waveguide circuit, a process for mounting light emitting elements onto a substrate may be omitted, whereby it is possible to further decrease the cost of production and accordingly to solve the abovementioned shortcomings.

That is, an optical integrated circuit for bidirectional communications according to the invention is such that a reflector of communication signal light is secured to a semiconductor light reception element connected to the outgoing end side of an optical waveguide circuit and a polarization plane modulating element is provided at the optical waveguide circuit, and when communication signal light passes through the optical waveguide circuit and is inputted into the semiconductor light reception element, the semiconductor light reception element is caused to receive the communication signal light by controlling the reception mode actuation portion, the reflector reflects communication signal light to the bidirectional input/output end side of the optical waveguide circuit without actuating the semiconductor light reception element when the communication signal light is inputted into the semiconductor light reception element by actuation of the transmission mode actuation portion, and plane polarization modulation is given to the reflected light for transmission. Therefore, the bidirectional communication is enabled without use of light emitting diodes such as laser diodes, etc. which were requisite in the conventional equipment.

Accordingly, not only it is possible to make the equipment small and to decrease the production cost in line with omission of light emitting diodes in the conventional equipment, but also it is possible to omit a large-sized light emission driving circuits, etc. for driving the light emitting elements, whereby it is possible to further make the equipment small and to secure higher integration of the equipment along with decreasing of the production cost.

Furthermore, according to an optical integrated circuit for bidirectional communications of the invention, it is not necessary to individually align the cores of both the light emitting element and light reception element and to optically couple them with respect to an optical waveguide circuit unlike conventional equipment in which an optical integrated circuit is constructed by using both light emitting diodes and semiconductor light reception elements. Since only semiconductor light reception elements may be optically coupled to an optical waveguide circuit, the core alignment and optical coupling can be easily carried out. In particular, since the mode field diameter of light emitting elements such as laser diodes, etc. is greatly different from the mode field diameter of the core of an optical waveguide circuit, there causes such problems where the core alignment work thereof is very difficult and the optical coupling loss will become large. However, the mode field diameter of the semiconductor light reception element is not greatly different from that of an optical waveguide circuit, the core alignment work is easily carried out, and the optical coupling loss will not become large. Therefore, the mounting of semiconductor light reception elements can be remarkably easily performed in comparison with the mounting of light emitting elements.

Accordingly, the mounting process of optical integrated circuits is very easy in an optical integrated circuit for bidirectional communications according to the invention, and in line therewith, it is possible to further decrease the production cost of the equipment and to make the same highly accurate.

Furthermore, according to an optical integrated circuit for bidirectional communications in which the abovementioned optical waveguide circuit is made an optical wavelength division multiplexer having a bidirectional light input/output port into which both communication signal light and non-communication signal light, the wavelength of which is different than that of the corresponding communication signal light, a communication light output port for leading the communication signal light of the communication signal light and non-communication signal light incident from the corresponding bidirectional light input/output port to the input side of a semiconductor light reception element, and a non-communication signal light for leading the non-communication light in a direction deviating from the input side of the corresponding semiconductor light reception element, it is possible to construct a high density light transmission system which is able to simultaneously carry out both optical communications using the communication signal light and picture proposal service using, for example, non-communication light as non-communication light, by using an optical fiber transmission cable, etc.

Furthermore, when forming an optical wavelength division multiplexer by the abovementioned optical waveguide circuit, in an optical integrated circuit for bidirectional communications, by providing the main light path for connecting the bidirectional light input/output port and a branched path branched from the main light path, providing a communication light selective transmission filter at the branch portion of the main light path and branch path, and forming a Mach-Zehnder interferometer type circuit by the first optical waveguide and the second optical waveguide, it is possible to construct an optical wavelength division multiplexer which is able to easily divide the communication signal light from the non-communication light at a high accuracy.

Furthermore, since an optical integrated circuit for bidirectional communications according to the invention is composed by forming the abovementioned polarization plane modulating element of piezoelectric elements, it is possible to form a polarization plane modulating element which is able to easily modulate the plane of polarization at a high accuracy.

According to an optical integrated circuit for bidirectional communications of the invention, in which the abovementioned piezoelectric element is constructed by laminating a lower electrode, a piezoelectric member and an upper electrode in the order on the surface of the upper clad layer, it is possible to easily form a piezoelectric element at a high accuracy, whereby it is possible to modulate the plane of polarization, which is carried out by a piezoelectric element, at a much higher accuracy.

Furthermore, according to an optical integrated circuit for bidirectional communications of the invention, in which the abovementioned substrate is made of a silicon substrate or silica glass substrate, and the optical waveguide circuit is formed by any one of flame deposition method, evaporation method, and chemical vapor phase growth method, it is possible to easily form an optical waveguide circuit at a high accuracy.

Still furthermore, according to an optical integrated circuit for bidirectional communications of the invention, in which a reverse bias impression device for impressing reverse bias voltage is connected to the abovementioned semiconductor light reception element, the reception mode actuation portion is constructed so as to drive the reverse bias impression device when communication signal light is inputted into the corresponding semiconductor light reception element, and the transmission mode actuation portion establishes a bias-free or forward bias state by stopping the reverse bias impression drive of the abovementioned reverse bias impression device when communication signal light is inputted into the semiconductor light reception element to transmit the communication signal light inputted into the semiconductor light reception element from the input side of the corresponding semiconductor light reception element to the reflector side, it is possible to easily control the reception of communication signal light by the reception mode actuation portion and also to easily to control the transmission of communication signal light by the transmission mode actuation portion.

Still furthermore, according to a method for producing an optical integrated circuit for bidirectional communications of the present invention, after optical waveguide circuits are formed on a substrate at areas other than those where semiconductor light reception elements are disposed, semiconductor light reception elements can be mounted at electrode patterns on the surface side of the area, at which semiconductor light reception elements are disposed, and it is possible to easily optically connect the semiconductor light reception elements to the outgoing end side of the core of an optical waveguide circuit at a high accuracy, whereby it is possible to easily produce an optical integrated circuit for bidirectional communications at a high accuracy.

BRIEF DESCRIPTION OF THE DRAWINGS

These and other objects and advantages of the present invention will become more apparent and more readily appreciated from the following detailed description of the exemplary embodiments of the invention, taken in conjunction with the accompanying drawings, in which.

DETAILED DESCRIPTION OF PREFERRED EMBODIMENTS

Figure 1:
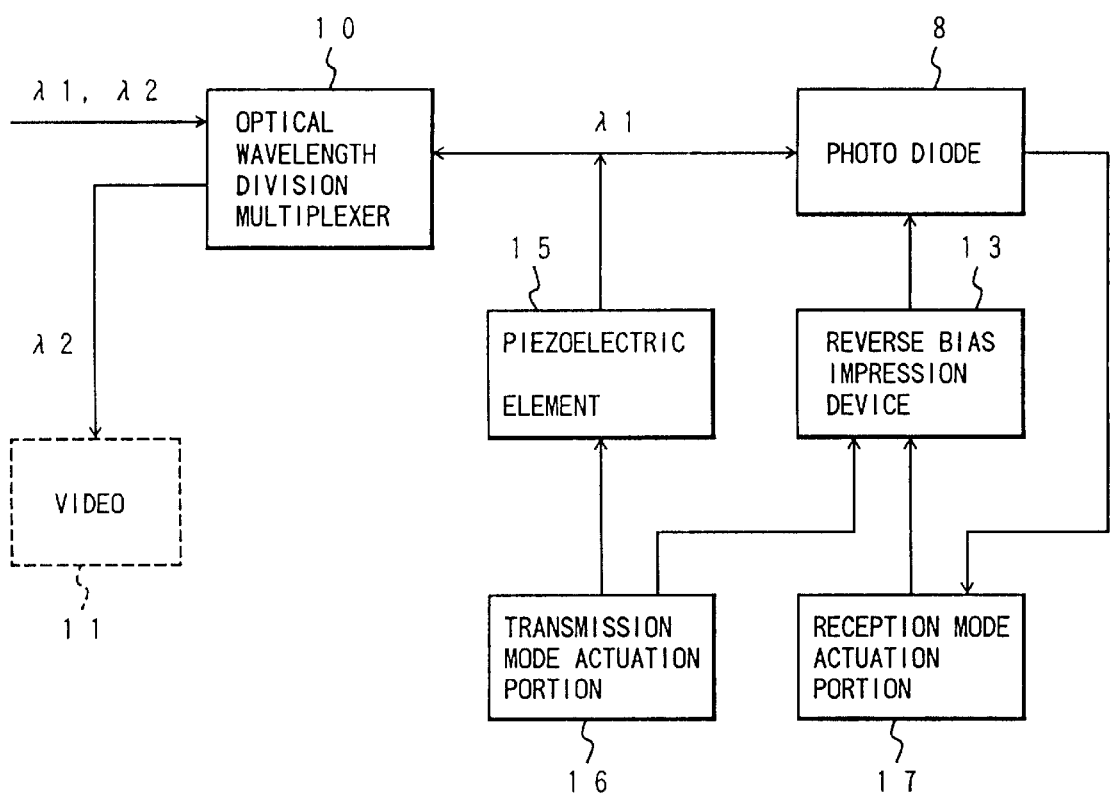
FIG. 1 is a block diagram showing a configuration of components of a preferred embodiment of an optical integrated circuit for bidirectional communications according to the invention.
Figure 2:
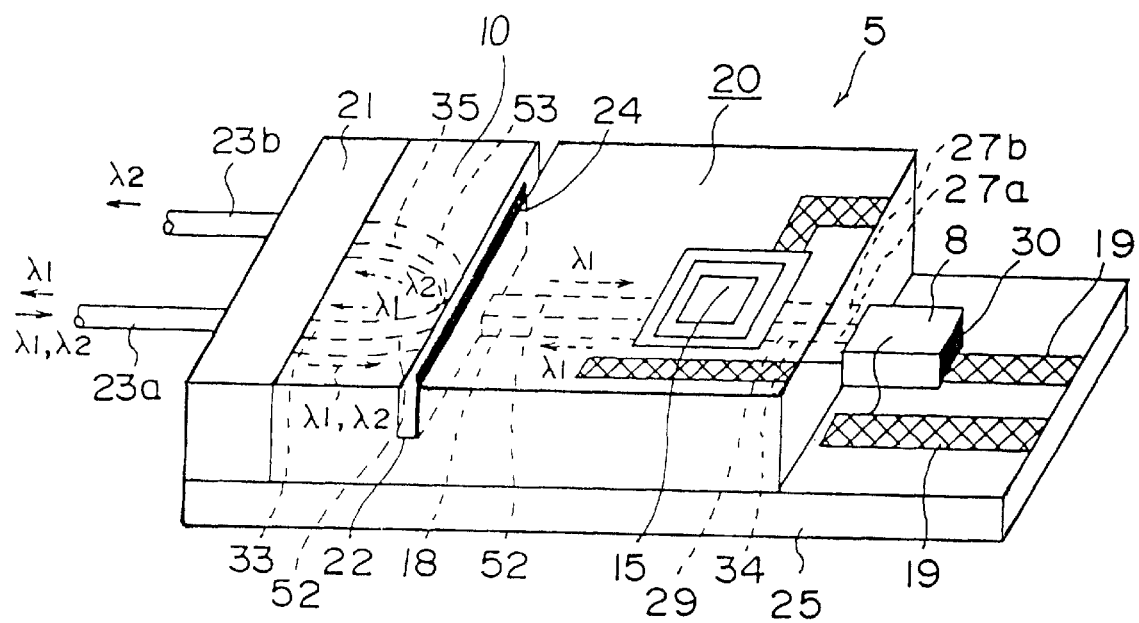
FIG. 2 is a construction view showing one example of optical transmitter-receiver equipment in which an optical integrated circuit according to the abovementioned preferred embodiment is used.

Hereinafter, a description is given of preferred embodiments of the invention with reference to the accompanying drawings. In the description of preferred embodiments of the invention, the parts which are identical to those in the conventional example are given the same reference numbers, and the description thereof is omitted. In FIG. 1, the construction of major parts of one preferred embodiment of an optical integrated circuit for bidirectional communications according to the invention is illustrated, using a block diagram. In FIG. 2, an example of the system configuration of optical transmitter-receiver equipment 5 using the optical integrated circuit is illustrated. As shown in FIG. 1, an optical integrated circuit for bidirectional communications of the preferred embodiment is constructed of an optical wavelength division multiplexer 10, a photo diode 8, a piezoelectric element 15, a reverse bias impression device 13, a transmission mode actuation portion 16, and a reception mode actuation portion 17.

Furthermore, as shown in FIG. 2, an optical waveguide circuit 20 is formed by forming a lower clad layer 27a, core 18 and upper clad layer 27b on a substrate 25 in the order, wherein a fiber fixing member 21 is secured at the incident side of the optical waveguide circuit 20 as in the conventional examples, and optical fibers 23a and 23b are disposed and fixed at the fiber fixing member 21. On the other hand, a photo diode 8 which acts as a semiconductor light reception element is connected to the outgoing end 29 side of the core 18 of the optical waveguide circuit 20 and is mounted on the substrate 25. A high reflection coating film 30 which functions as a reflector of communication signal light is provided at the photo diode 8. Furthermore, a piezoelectric element 15 which acts as a polarization plane modulating element is formed on the surface of the upper clad layer 27b at the upper side at the outgoing end 29 side of the core 18.

The optical waveguide circuit 20 has a bidirectional light input/output port 33 into which both communication signal light of wavelength 81 and non-communication signal light (wavelength 82) having a different wavelength from the communication signal light, a communication light output port 34 for leading only the communication signal light of the communication signal light and non-communication light which are made incident from the bidirectional light input/output port 33 to the input side of the photo diode 8 and a non-communication light output port 35 for leading the non-communication light in a direction deviating from the input side of the photo diode 8, thereby constituting an optical wavelength division multiplexer 10 shown in FIG. 1. The bidirectional light input/output port 33 is connected to the optical fiber 23a, the communication light output port 34 is connected to the photo diode 8, and the non-communication light output port 35 is connected to the optical fiber 23b.

Furthermore, a main light path 52 which connects the bidirectional light input/output port 23 and communication light output port 34 is formed, and the non-communication light output port 35 is provided at the outgoing end side of a branch path 53 which is branched from the main light path 52, wherein a filter groove 22 is formed at the branch portion where the main light path 52 and branch path 53 are separated from each other, and a communication light selective transmission filter 24 is provided at the filter groove 22. The communication light selective transmission filter 24 has functions of transmitting the communication signal light incident from the bidirectional light input/output port 33 to the communication light output port 34 side, transmitting the reflected light of the photo diode 8 of the communication signal light to the bidirectional light input/output port 33 side, and reflecting the non-communication light incident from the bidirectional light input/output port 33 to the branch path 53 side.

Furthermore, in the preferred embodiment, a substrate 25 is made of silicon substrate, and the optical waveguide circuit 20 is formed by any one of flame deposition method, evaporation method, and chemical vapor phase growth method.

The abovementioned piezoelectric element 15 is, in this preferred embodiment, constructed by laminating and forming a lower electrode, a piezoelectric member, and an upper electrode in the order on the surface side of the abovementioned upper clad layer 27b. In detail, an Au/Cr multilayered film is deposited as the lower electrode, ZnO is formed to be film-like as a piezoelectric member by using a high-frequency magnetron spattering apparatus thereon, and furthermore, an Au/Cr multilayered film is formed thereon as the upper electrode by the same deposition method as that for the lower electrode. Furthermore, it is necessary to orient the ZnO in C axis in order to obtain a good piezoelectric film. Since the atomic orientation of ZnO in C axis is well matched to the atomic orientation of (111) plane of Au, it is possible to form a good piezoelectric film by orienting Au in (111) plane. Still furthermore, by depositing Cr as the undercoat of Au, it is possible to increase the (111) plane orientation of Au in addition to an increase of the adhesivity of Au to glass.

The photo diode 8 is mounted to the substrate 25 via an electrode pattern 19. A reception mode actuation portion 17 which actuates the photo diode 8 in line with the synchronization timing of reception when communication signal light is inputted into the photo diode 8 through the optical waveguide circuit 20 and causes the photo diode 8 to receive the communication signal light is connected to the photo diode 8 as shown in FIG. 1. Furthermore, although not illustrated in FIG. 1, a light reception drive circuit and a reception modulating circuit which are similar to those in the conventional example are connected to the reception mode actuation portion 17. A reverse bias impression device 13 which is similar to that of the conventional example is connected to the photo diode 8, and the reception mode actuation portion 17 is constructed so that the photo diode 8 is actuated by driving the reverse bias impression device 13 when communication signal light is inputted into the photo diode 8.

The transmission mode actuation portion 16 reflects the communication signal light to the incident side (bidirectional light input/output port 33 side) of the optical waveguide circuit 20 by the high reflection coating film 30 without actuating the photo diode 8 when the communication signal light is inputted into the photo diode 8, simultaneously gives a polarization plane modulation to the reflected light of the communication signal light by the abovementioned piezoelectric element 15, and transmits the polarization plane modulated light into the incident side (bidirectional light input/output port 33 side) of the core 18 of the optical waveguide circuit 20 as transmission light. With respect to this control, the transmission mode actuation portion 16 is constructed so that the same establishes a bias-free or a forward bias state by stopping the reverse bias drive of the reverse bias impression device 13 when the communication signal light is inputted into the photo diode 8 and the communication signal light inputted into the photo diode 8 is transmitted (guided) from the input side of the photo diode 8 to the high reflection coating film 30 side.

Figure 5A:
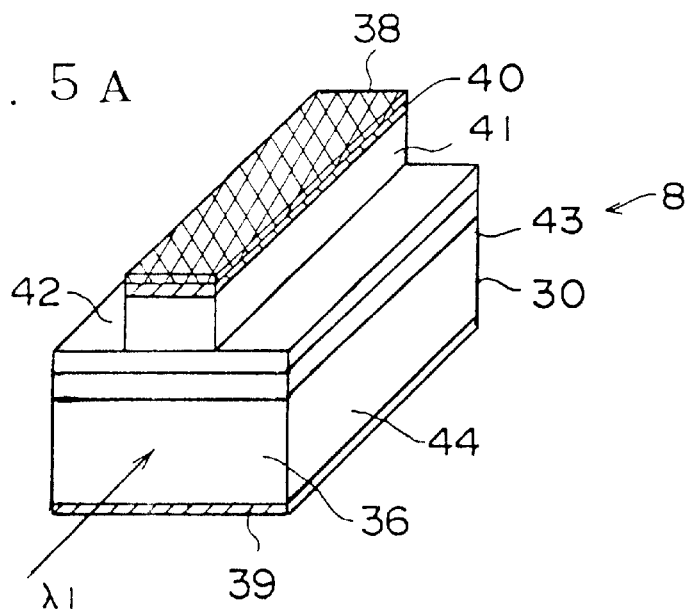
FIG. 5A and FIG. 5B are explanatory views showing a construction example of a photo diode used for the preferred embodiments of an optical integrated circuit for bidirectional communications according to the invention.
Figure 5B:
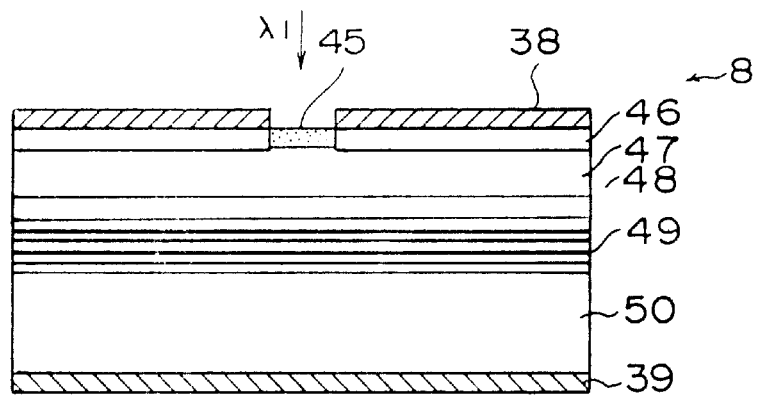

FIG. 5A and FIG. 5B respectively show the detailed construction example of the photo diode 8, wherein FIG. 5A shows a waveguide type light reception element and FIG. 5B shows a plane type light reception element. In these drawings, 36 is a low reflection coating portion, 38 is an upper electrode, 39 is a lower electrode, 40 is a p-InGaAs contact layer, 41 is an InP ridge, 42 is a p-InP upper clad, 43 is a 1-InGaAs P core layer, 44 is an N-InP lower clad, 45 is non-reflection coating, 46 is a 1-InGaAs contact layer, 47 is an InP upper clad, 48 is a multiple quantum well, 49 is a black reflection mirror, and 50 is an InP lower clad.

For example, a waveguide type light reception element shown in FIG. 5A has such a laminated structure where a 1-InGaAs P core layer 43 is put between the n-InP lower clad 44 and p-InP upper clad 42, thereby forming a PN junction diode. In this photo diode 8, the low reflection coating portion 36 is formed at the incident side of light and a high reflection coating film 30 is formed at the opposite side thereof, wherein as reverse bias impression voltage is impressed from the reverse bias impression device 13 to the photo diode 8, the same can be detected as an optical current in response to the modulation of the incident light (communication signal light) passing through the 1-InGaAs P core layer 43.

Furthermore, in a case of a bias-free state where no reverse bias voltage is impressed in the photo diode 8, the 1-InGaAs P core layer 43 becomes almost transparent. Therefore, as a bias-free state is established by stopping the drive of the reverse bias impression device at the abovementioned transmission mode actuation portion 16 when communication signal light is transmitted, the communication signal light which is made incident into the photo diode 8 arrives at the high reflection coating film 30 through the 1-InGaAsP core layer 43, where the same is reflected by the high reflection coating layer 30.

Furthermore, in a case of a plane type light reception element shown in FIG. 5B, the multiple quantum well 48 functions like the 1-InGaAsP core layer 43 of the waveguide type light reception element shown in FIG. 5A, and the photo diode 8 is detected as an optical current in response to the modulation of the incident communication signal light when reverse bias voltage is impressed by the reverse bias impression device 13, and when the bias-free state is established, the incident communication signal light arrives at the Bragg reflection mirror 49 through the multiple quantum well 48, wherein the same is reflected by the Bragg reflection mirror 49.

The preferred embodiment is constructed as described above, and when an optical integrated circuit for bidirectional communications is produced, for example, an optical waveguide circuit 20 is formed at areas other than the areas excepting the areas where the photo diode 8 is disposed on the substrate 25, and an electrode pattern 19 is formed on the surface side of the areas, at which the photo diode 8 is disposed, at the substrate 25. Thereafter, by mounting the photo diode 8 on the electrode pattern 19 and connecting the same at the outgoing end 29 side of the core 18 of the optical waveguide circuit 20, an optical integrated circuit for bidirectional communications can be produced.

Figure 6:
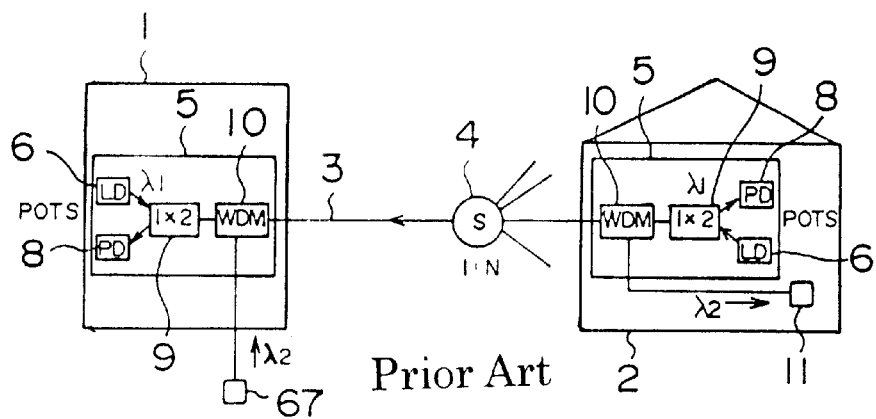
FIG. 6 is an explanatory view showing one example of an optical transmission system for an optical subscriber system.
Figure 7:
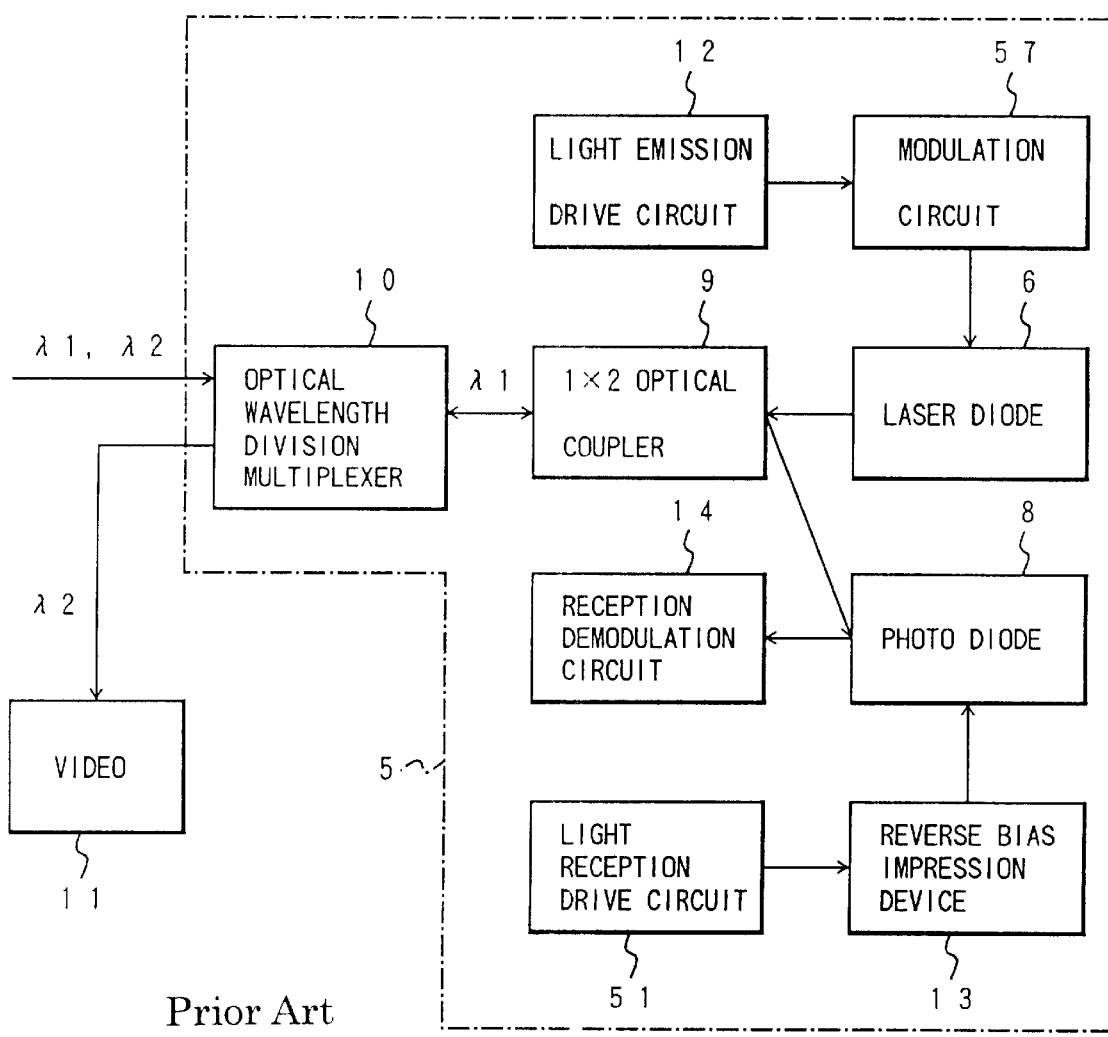
FIG. 7 is an explanatory block diagram showing a construction example of conventional optical transmitter-receiver equipment.
Figure 8:
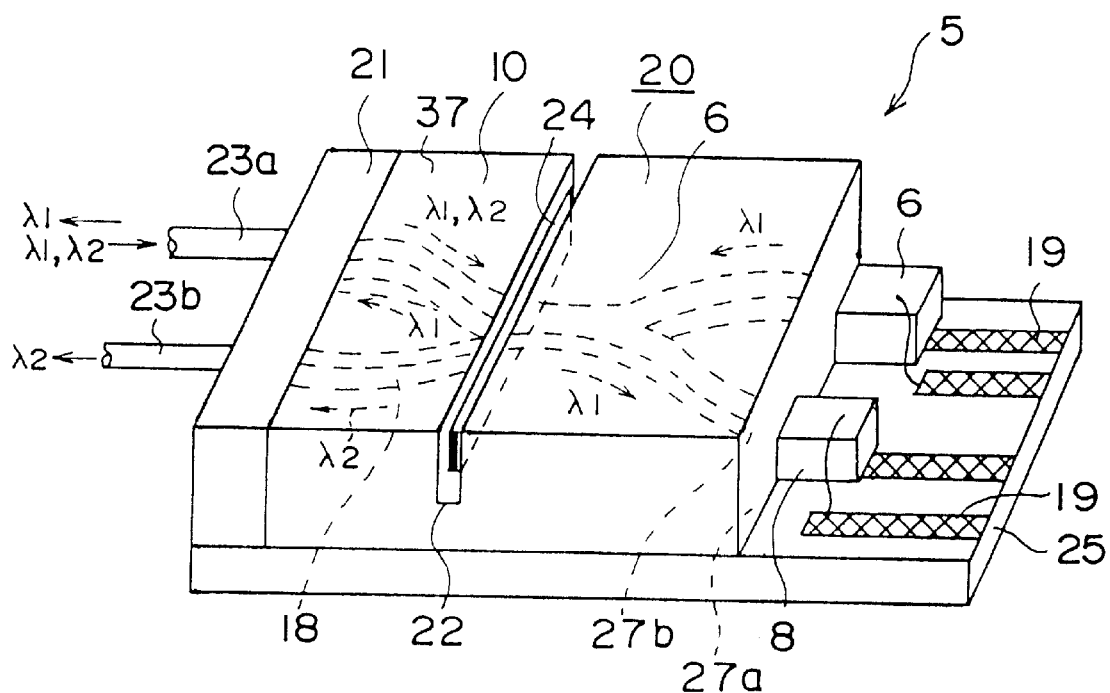
FIG. 8 is an explanatory view showing the equipment construction example of the conventional optical transmitter-receiver equipment.

Next, a description is given of the actions of the preferred embodiment. Furthermore, this embodiment is, for example, installed at a subscriber house 2, as well as the conventional optical transmitter-receiver equipment 5, wherein an optical fiber 23a is connected to an optical fiber transmission cable 3 of an optical transmission system for subscribers as shown in FIG. 6 while an optical fiber 23b is connected to a picture signal light reception device such as a video 11, etc. And as communication signal light of wavelength /l1 and picture signal light 82 which are transmitted by the optical fiber transmission cable 3 and passes through the optical fiber 23a are made incident from the bidirectional light input/output port 33 of the optical waveguide circuit 20, the communication signal light and picture signal light are made incident into a communication light selective transmission filter 24, wherein the communication signal light of wavelength /l1 is transmitted through the communication light selective transmission filter 24 and advances to the communication light output port 34 side while the picture signal light of wavelength 82 is reflected by the communication light selective transmission filter 24, advances to the non-communication light output port 35 side and is further received by the video 11, etc. via the optical fiber 23*b*.

The communication signal light propagated to the communication light output port 34 side is caused to exit from the outgoing end 29 side and is inputted into the photo diode 8. However, at this time, at the reception mode for receiving communication signal light by the photo diode 8, the photo diode 8 is driven by the reverse bias impression device 13, which is carried out in response to the synchronization timing of reception on the basis of control of the reception model actuation portion 17 when the communication signal light is inputted into the photo diode 8, whereby the communication signal light is received by the photo diode 8. This reception signal is demodulated by a reception demodulation circuit secured at the reception mode actuation portion and is detected as an optical current.

On the other hand, at the transmission mode which is able to transmit communication signal light from the optical integrated circuit for bidirectional communications, the drive of the reverse bias impression device is obstructed by the transmission mode actuation portion 16, whereby the photo diode 8 is not actuated. Therefore, the communication signal light inputted into the photo diode 8 by a station 1 side is allowed to reach the high reflection coating layer 30, wherein the communication signal light is reflected by the high reflection coating layer 30 to the bidirectional input/output end side of the optical waveguide circuit 20. Furthermore, at this time, high-frequency signals are impressed as transmission signals by the transmission mode actuation portion 16, using a piezoelectric element 15, whereby elastic waves are generated by a piezoelectric film of the piezoelectric element 15, the elastic waves operate on the core 18 to cause birefringence to be produced at the core 18. Accordingly, with this action, polarization plane modulation is given to the reflected light of the communication signal light, wherein the polarization plane modulated light is constituted to be transmission light which is able to pass through the core 18 and pass through the communication light selective transmission filter 24. Herein, the modulated light reversely moves to the bidirectional light input/output port 33 side and is transmitted by the light fiber transmission cable 3, passing through the optical fiber 23*a*, whereby the light transmission is thus carried out.

Furthermore, since the transmission light is made polarization plane modulated light, the polarization plane modulated light is caused to pass through an optical detector, etc. at the light reception portion (for example, station 1 side) of the transmission light to demodulate the same as intensity modulated light, and the same can be detected.

According to the preferred embodiment, by the above-mentioned actions, it is possible to carry out light transmission by utilizing communication signal light transmitted from the station 1 side without using any light emitting elements such as laser diodes 6, etc. which are requisite in the conventional light transmitter-receiver equipment 5, and it is possible to carry out bidirectional communications of light using the photo diode 8 which acts as a semiconductor light reception element. Therefore, it is possible to achieve the downsizing of facility and a decrease of the production cost in line with omission of light emitting elements such as laser diodes 6, etc.

Furthermore, as in the conventional example, in a case where communication signal light is transmitted by using light emitting elements such as laser diodes 6, etc., it is necessary to emit intensive light which is caused to transmit through an optical fiber transmission cable 3. Therefore, a large-sized and highly accurate light emission drive circuit is required. However, according to the preferred embodiment, communication signal light is given polarization plane modulation by utilizing the communication signal light transmitted, for example, from the station 1 side to a subscriber house 2 side and received by the photo diode 8 in order to cause the same to be transmission light from the subscriber house 2 side. Therefore, it is needless to say that no large-sized drive circuit is required, and the transmission light can be easily formed by the polarization plane modulation of the communication signal light received by the photo diode 8 side. Accordingly, it is possible to easily obtain light transmission from subscriber houses 2 side at a decreased production cost.

Furthermore, according to the preferred embodiment, in addition to the downsizing and high integration of the facility, and decrease of the production cost in line with omission of light emitting elements such as laser diodes 6, etc. and light emission drive circuit 12, which are requisite in the conventional optical transmitter-receiver equipment 5, only the photo diode 8 may be aligned with and optically coupled to the optical waveguide circuit 20, differing from the conventional optical transmitter-receiver equipment 5 for which the laser diode 6 and photo diode 8 must be individually aligned and optical coupled to the optical waveguide circuit 20. Therefore, the alignment work and optical coupling thereof can be easily carried out in a short time.

Still furthermore, since the mode field diameter of the photo diode 8 is not greatly different from the mode field diameter of the core 18 of the optical waveguide circuit 20 unlike the mode field diameter of laser diode 6, the optical coupling loss will not be increased unlike the optical coupling between the laser diode 6 and the optical waveguide circuit 20 in the conventional equipment. Furthermore, no countermeasure against reflection is required in order to prevent the optical coupling loss from being increased. Therefore, it is possible to produce equipment. Resultantly, the production cost of the equipment can be further decreased.

Furthermore, according to the preferred embodiment, a polarization plane modulating element to give polarization plane modulation to the reflection light at the photo diode 8 with respect to communication signal light is formed of piezoelectric elements 15. Since it is possible easily form the piezoelectric elements 15 at a high accuracy by laminating and forming a lower electrode, a piezoelectric member and an upper electrode in the order on the surface side of the upper clad layer 27*b* of the optical waveguide circuit 20, the equipment can be further easily produced, and it is possible to produce highly accurate equipment.

Furthermore, according to the preferred embodiment, since Au/Cr multiple layers are used as a lower electrode and an upper electrode when forming the piezoelectric element 15, the Au glass adhesivity can be increased by depositing Cr as the undercoat of Au, and the (111) plane orientation of Au can be improved. Still furthermore, the C axis orientation of ZnO can be performed by depositing and forming a ZnO piezoelectric member at the lower electrode of Au/Cr. Moreover, by giving polarization plane modulation to the reflection light of the communication signal light using the piezoelectric element 15, the polarization plane modulation can be further accurately carried out.

Furthermore, the present invention is not limited to the preferred embodiment. Various variations and modifications may be available as embodiments thereof. For example, in the abovementioned preferred embodiment, although an optical waveguide circuit 20 is constructed by forming a lower clad layer 27a, a core 18 and an upper clad layer 27b on the surface side of a substrate 25 in the order, the surface of which is flat, for example, as shown in FIG. 3, the optical waveguide circuit 20 may be constructed by forming a lower clad layer 27a on a substrate 25 having a dent portion 28 and forming a core layer 18 and an upper clad layer 27b thereon.

Figure 3:
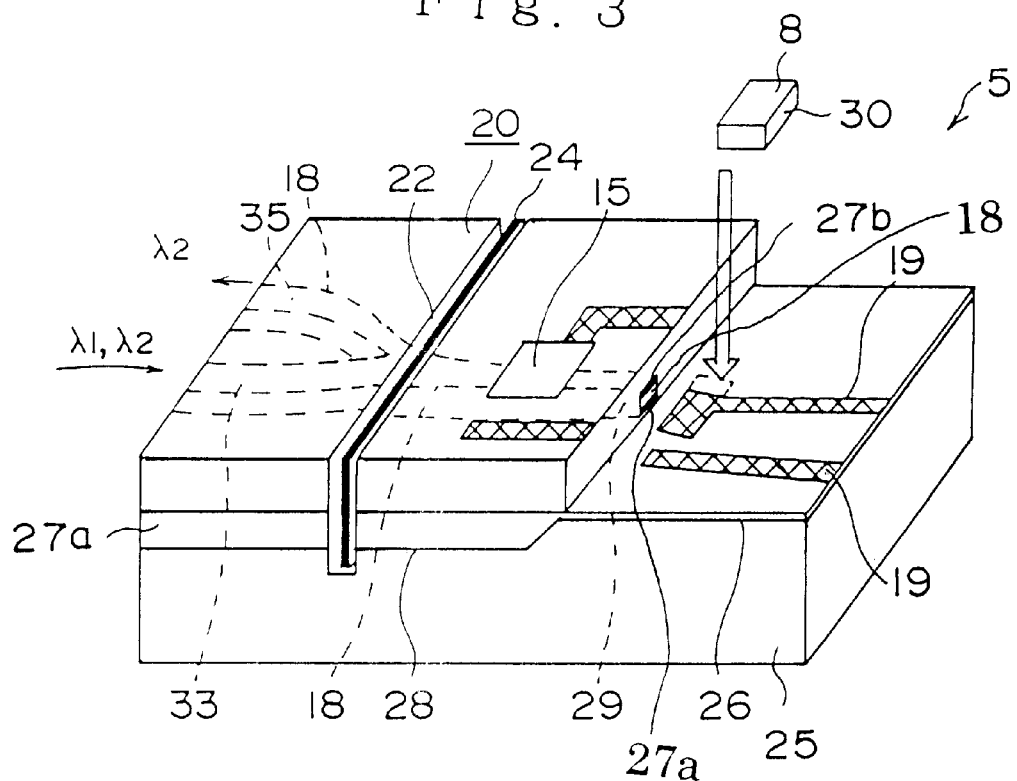
FIG. 3 is an explanatory view showing an equipment construction of another preferred embodiment of an optical integrated circuit for bidirectional communications according to the invention.

Still furthermore, although in the above preferred embodiment an electrode pattern 19 is directly formed on the surface side of a substrate 25 and a photo diode 18 is mounted on the electrode pattern 19, for example, as shown in FIG. 3, the photo diode 18 may be mounted on an electrode pattern 19 which is formed on the upper side of an insulation film 26 formed on the surface side of the substrate 25 as necessary.

Figure 4:
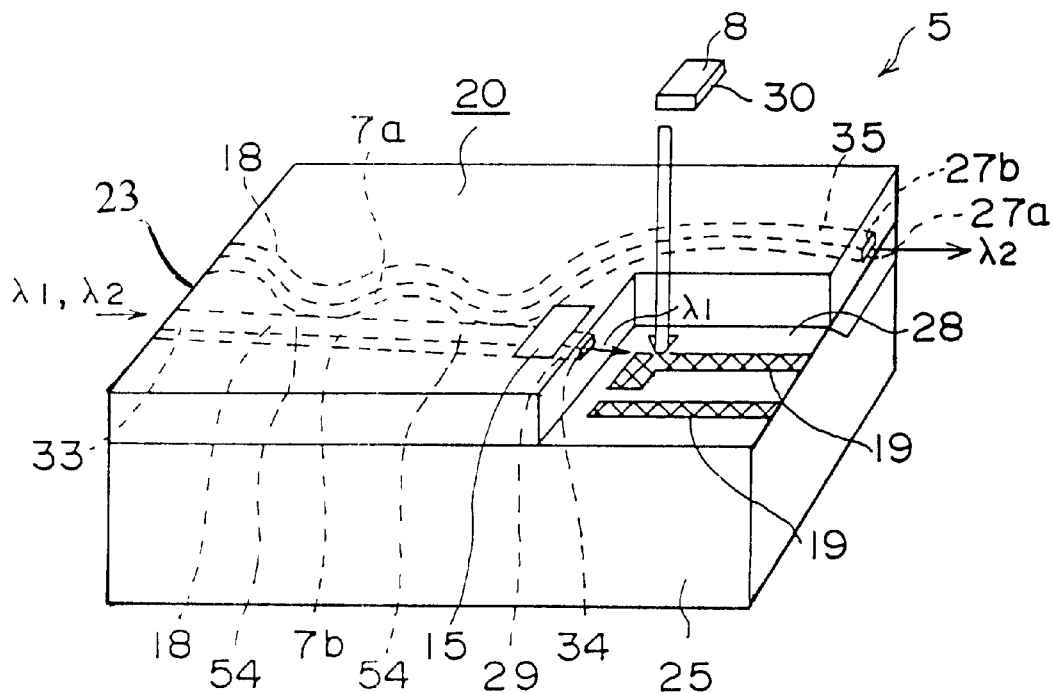
FIG. 4 is an explanatory view showing an equipment construction of still another preferred embodiment of an optical integrated circuit for bidirectional communications according to the invention.

Furthermore, with the abovementioned preferred embodiment, the optical waveguide circuit 20 has a main light path 52 and a branch path 53 and provides a communication light selective transmission filter 24 at the branch portion of the main light path 52 and branch path 53, and accordingly an optical wavelength division multiplexer 10 is formed, which is able to divide the communication signal light and non-communication signal light incoming from the bidirectional light input/output port 33 and leads the communication signal light to the communication light output port 34 side and leads the non-communication light to the non-communication light output port 35 side. However, for example, as shown in FIG. 4, the optical waveguide circuit 20 may be a Mach-Zehnder interferometer type circuit having the first optical waveguide 7a and second waveguide 7b.

Furthermore, the Mach-Zehnder interferometer type circuit is such that the first waveguide 7a and second waveguide 7b are juxtaposed and formed in a row with a gap secured therebetween, two directional couplers 54 which are formed with the first optical waveguide 7a and second optical waveguide 7b approached each other partway of the first optical waveguide 7a and second optical waveguide 7b are arranged in series, and a phase-shifting portion in which the length of the first optical waveguide 7a and that of the second optical waveguide 7b are made relatively different from each other is caused to intervene between the two directional couplers 54. And in the example shown in FIG. 4, the incident side of the second optical waveguide 7b is made a bidirectional light input/output port 33, and the outgoing side thereof is made a communication light output port 34 while the outgoing side of the first optical waveguide 7a is made a non-communication light output port 35.

Furthermore, when a Mach-Zehnder interferometer type circuit is used for an optical wavelength division multiplexer 10 composed of an optical waveguide circuit 20, the incident side of any one of the first and second optical waveguides may be made a bidirectional light input/output port, the outgoing side of any one of the first and second waveguides may be made a communication light output port, and the outgoing side of the other optical waveguide may be made a non-communication light output port.

Furthermore, in the abovementioned preferred embodiment, although the piezoelectric element 15 is constructed by laminating and forming a lower electrode of Au/Cr, a piezoelectric member of ZnO, and an upper electrode of Au/Cr in the order on the surface side of the upper clad layer 27b of the optical waveguide circuit 20, it is not necessary that the formation method of the piezoelectric element 15 and materials used for forming the piezoelectric element 15 are particularly limited, they may be adequately determined.

Still furthermore, in the above preferred embodiment, although a polarization plane modulating element which gives polarization plane modulation to the reflection light at the photo diode 8 of communication signal light is formed of a piezoelectric element 15, the polarization plane modulating element may not be necessarily limited to the formation by a piezoelectric element 15. The same may be any element which is able to modulate the plane of polarization with respect to the reflection light of the communication signal light.

Furthermore, in the above preferred embodiment, although the substrate 25 is a silicon substrate, the substrate 25 is not limited to a silicon substrate. It may be made of silica glass substrate.

Furthermore, in the abovementioned preferred embodiment, although the optical waveguide circuit 20 is formed by any one of flame deposition method, evaporation method, and chemical vapor phase growth method, the optical waveguide circuit 20 may be formed by a method other than these.

Furthermore, although in the preferred embodiment the transmission mode actuation portion 16 causes the photo diode 8 to enter a bias-free state by stopping the drive of a reverse bias impression device 13 when communication signal light is inputted into the photo diode 8 and causes the photo diode 8 not to be operated, the transmission mode actuation portion 16 may cause the reverse bias impression device 13 to enter a forward bias state by stopping the drive of the reverse bias impression device 13, thereby causing the photo diode 8 not to be operated.

Furthermore, in the preferred embodiment it is constructed that the optical waveguide circuit 20 is made a circuit of the optical wavelength division multiplexer 10, for example, wherein communication signal light of wavelength 81 and non-communication signal light (for example, picture signal light of a wavelength 82) of a wavelength different from the wavelength of the communication signal light is inputted into the bidirectional light input/output port 33, only the communication signal light is outputted from the communication light output port 34 (the output end 29 of the core 18) and is inputted into the photo diode 8 while the non-communication light is outputted from the non-communication light output port 35. However, the optical waveguide circuit 20 provided in an optical integrated circuit for bidirectional communications according to the invention may not be necessarily limited to the circuit of an optical wavelength division multiplexer 10.

For example, the optical waveguide circuit 20 may be constituted to be a circuit having a core 18, communication signal light inputted into a semiconductor light reception element such as a photo diode 8, etc. through the core 18 is received by the semiconductor light reception element by controlling the reception mode actuation portion 17, and communication signal light is reflected to the optical waveguide circuit 20 side by controlling the transmission mode actuation portion 16, wherein polarization plane modulation is given to the reflection light to form transmission light, and thereby is transmitted to the incident side of the core 18 (that is, the bidirectional light input/output end side).

However, when an optical integrated circuit for bidirectional communications according to the invention is applied to a subscriber light transmission system as shown in FIG. 6, if it is possible to receive both communication signal light and non-communication light such as picture signal light, etc. as in the abovementioned preferred embodiment wherein communication can be carried out by only the communication signal light and the picture signal light can be introduced to a picture signal light receiving device such as a video 11, etc., a system which can provide both services of communication by communication signal light and picture signal transmission by picture signal light by utilizing an optical fiber transmission cable 3 can be constructed at a decreased production cost.

What is claimed is:

1. An optical integrated circuit for bidirectional communications in which an optical waveguide circuit having a lower clad layer, a core and an upper clad layer formed in order on a substrate and a semiconductor light reception element is connected to an outgoing end side of said core of said optical waveguide circuit, comprising:

a reception mode actuation portion in which a reflector for communication signal light is provided at said semiconductor light reception element, a polarization plane modulating element formed on a surface side of said upper clad layer of said optical waveguide circuit in a channel disposed to receive reflection light reflected by said reflector and arriving at the bidirectional input/output end of said optical waveguide circuit, said semiconductor light reception element for being actuated in line with a synchronization timing of reception when communication signal light is inputted into said semiconductor light reception element through said optical waveguide circuit for causing said communication signal light to be received by said semiconductor light reception element; and a transmission mode actuation portion wherein communication signal light is reflected to said bidirectional input/output end side of said optical waveguide circuit by said reflector without actuating said semiconductor light reception element when said communication signal light is inputted into said semiconductor light reception element, in line therewith polarization plane modulation is given to said reflection light by said polarization plane modulating element, and said polarization plane modulated light being made transmission light and the same being transmitted to said bidirectional input/output end side of the core of said optical waveguide circuit.

2. An optical integrated circuit for bidirectional communications as set forth in claim 1, wherein said optical waveguide circuit is constituted as an optical wavelength division multiplexer having a bidirectional light input/output port into which both communication signal light and non-communication signal light, the wavelength of which is different from that of said communication signal light, are made incident, a communication light output port for leading only said communication signal light of the communication signal light and non-communication signal light to the input side of said semiconductor light reception element, and a non-communication signal light output port for leading said non-communication signal light in a direction deviating from the input side of said semiconductor light reception element.

3. An optical integrated circuit for bidirectional communications as set forth in claim 2, wherein said optical waveguide circuit has a main light path for connecting said bidirectional light input/output port and communication light output port, a non-communication light output port is provided at the outgoing end side of a branch path branched from said main light path, and a communication light selective transmission filter is provided at the branch portion of said main light path and branch path, for transmitting communication signal light incident from said bidirectional light input/output port to said communication light output port side, for transmitting the light reflected by a semiconductor light reception element of said communication signal light to said bidirectional light input/output port, and for reflecting said non-communication light incident from said bidirectional light input/output port to said branch path side.

4. An optical integrated circuit for bidirectional communications as set forth in claim 3, wherein a reverse bias impression device for impressing reverse bias voltage is connected to the semiconductor light reception element, a reception mode actuation portion is constructed so as to drive said reverse bias impression device when communication signal light is inputted into said semiconductor light reception element, and a transmission mode actuation portion establishes a bias-free state or forward bias state by stopping the impression and drive of reverse bias to said reverse bias impression device when communication signal light is inputted into said semiconductor light reception element, thereby causing the communication signal light inputted into said semiconductor light reception element to be transmitted from the input side of said semiconductor light reception element to the reflector side.

5. An optical integrated circuit for bidirectional communications as set forth in claim 2, wherein said optical waveguide circuit is constructed to be a Mach-Zehnder interferometer type circuit which has a first optical waveguide and second optical waveguide, wherein the first optical waveguide and second optical waveguide are juxtaposed and formed in a row with a gap provided therebetween, two directional couplers formed by drawing said first optical waveguide and second optical waveguide closer to each other are disposed in a series partway of said first optical waveguide and second optical waveguide, and a phase-shifting portion in which the lengths of said first optical waveguide and second optical waveguide are relatively changed intervenes between said two directional couplers, and the incident side of any one of said first and second optical waveguides is made a bidirectional light input/output port, the outgoing side of any one of said first and second optical waveguides is made a communication light output port, and the outgoing side of the other optical waveguide is made a non-communication output port.

6. An optical integrated circuit for bidirectional communications as set forth in claim 5, wherein a reverse bias impression device for impressing reverse bias voltage is connected to the semiconductor light reception element, a reception mode actuation portion is constructed so as to drive said reverse bias impression device when communication signal light is inputted into said semiconductor light reception element, and a transmission mode actuation portion establishes a bias-free state or forward bias state by stopping the impression and drive of reverse bias to said reverse bias impression device when communication signal light is inputted into said semiconductor light reception element, thereby causing the communication signal light inputted into said semiconductor light reception element to be transmitted from the input side of said semiconductor light reception element to the reflector side.

7. An optical integrated circuit for bidirectional communications as set forth in claim 2, wherein a reverse bias impression device for impressing reverse bias voltage is connected to the semiconductor light reception element, a reception mode actuation portion is constructed so as to drive said reverse bias impression device when communication signal light is inputted into said semiconductor light reception element, and a transmission mode actuation portion establishes a bias-free state or forward bias state by stopping the impression and drive of reverse bias to said reverse bias impression device when communication signal light is inputted into said semiconductor light reception element, thereby causing the communication signal light inputted into said semiconductor light reception element to be transmitted from the input side of said semiconductor light reception element to the reflector side.

8. An optical integrated circuit for bidirectional communications as set forth in claim 1, wherein a reverse bias impression device for impressing reverse bias voltage is connected to the semiconductor light reception element, a reception mode actuation portion is constructed so as to drive said reverse bias impression device when communication signal light is inputted into said semiconductor light reception element, and a transmission mode actuation portion establishes a bias-free state or forward bias state by stopping the impression and drive of reverse bias to said reverse bias impression device when communication signal light is inputted into said semiconductor light reception element, thereby causing the communication signal light inputted into said semiconductor light reception element to be transmitted from the input side of said semiconductor light reception element to the reflector side.

9. An optical integrated circuit for bidirectional communications as set forth in claim 1, wherein a polarization plane modulation element is formed of a piezoelectric element.

10. An optical integrated circuit for bidirectional communications as set forth in claim 9, wherein said piezoelectric element is constructed by depositing and forming a lower electrode, a piezoelectric member and an upper electrode in the order on the surface side of an upper clad layer.

11. An optical integrated circuit for bidirectional communications as set forth in claim 1, wherein a substrate is made of a silicon substrate or silica glass substrate, and an optical waveguide circuit is formed by any one of flame deposition method, evaporation method, and chemical vapor phase growth method.

12. A method for producing an optical integrated circuit for bidirectional communications, wherein after an optical waveguide circuit for enabling bidirectional communications is formed on a substrate at areas other than those where a semiconductor light reception element provided with a reflector is disposed and electrode patterns are deposited and formed on the surface side of the areas, at which semiconductor light reception elements are disposed, of a substrate, semiconductor light reception elements are mounted on said electrode patterns and said semiconductor light reception elements are optically connected to an outgoing end side of a core of said optical waveguide circuit, and a polarization plane modulating element is mounted on the surface side of said optical waveguide circuit.

\* \* \* \* \*